US012777229B2

(12) United States Patent
Torgerson

(10) Patent No.: US 12,777,229 B2
(45) Date of Patent: *Oct. 27, 2026

(54) CLOUD-BASED VIDEO USER INTERFACES

(71) Applicant: Sonos, Inc., Goleta, CA (US)

(72) Inventor: Jeffrey Michael Torgerson, Stanwood, WA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/969,003

(22) Filed: Dec. 4, 2024

(65) Prior Publication Data

US 2025/0159297 A1 May 15, 2025

Related U.S. Application Data

(63) Continuation of application No. 17/906,281, filed as application No. PCT/US2021/070266 on Mar. 11, 2021, now Pat. No. 12,167,092.

(60) Provisional application No. 62/991,780, filed on Mar. 19, 2020.

(51) Int. Cl.

| | |
|---|---|
| ***H04N 21/472*** | (2011.01) |
| ***H04N 21/258*** | (2011.01) |
| ***H04N 21/475*** | (2011.01) |
| ***H04N 21/482*** | (2011.01) |

(52) U.S. Cl.

CPC . *H04N 21/47202* (2013.01); *H04N 21/25816* (2013.01); *H04N 21/4753* (2013.01); *H04N 21/482* (2013.01)

(58) Field of Classification Search

CPC ......... H04N 21/4532; H04N 21/43615; H04N 21/8456; H04N 21/41265; H04N 21/2668; H04N 21/4627

See application file for complete search history.

(56) References Cited

U.S. PATENT DOCUMENTS

| | | | | |
|---|---|---|---|---|
| 12,167,092 | B2 * | 12/2024 | Torgerson | H04N 21/482 |
| 2009/0193464 | A1 * | 7/2009 | Friedlander | H04N 21/6125 725/41 |
| 2012/0284757 | A1 * | 11/2012 | Rajapakse | H04N 21/41407 725/81 |
| 2012/0311075 | A1 * | 12/2012 | Pantos | H04N 21/4856 709/217 |
| 2012/0314139 | A1 * | 12/2012 | Siegel | H04N 21/41407 348/731 |
| 2013/0312073 | A1 * | 11/2013 | Srivastav | H04L 9/3215 726/7 |
| 2019/0132640 | A1 * | 5/2019 | Gauthier | H04N 21/25816 |
| 2022/0345839 | A1 * | 10/2022 | Proctor, Jr. | H04N 21/8106 |

* cited by examiner

*Primary Examiner* — Jason Salce

(74) *Attorney, Agent, or Firm* — Fortem IP LLP

(57) ABSTRACT

Playback devices can support playing back audio content of audio-visual content received from a media service, while corresponding video content is synchronously played back on a video display device. In some examples, the device can cause the video display device to display a graphical user interface that includes a plurality of media services associated with a user account, receive a user selection for media playback of audio-visual content from one of the media services, transmit a request for the user-selected audio-visual content to the selected media service, and receive audio and video content of the audio-visual content.

20 Claims, 12 Drawing Sheets

CLOUD-BASED VIDEO USER INTERFACES

CROSS-REFERENCE TO RELATED APPLICATION

The present application is a continuation of U.S. patent application Ser. No. 17/906,281, filed Sep. 14, 2022, now U.S. Pat. No. 12,167,092, which is a 371 U.S. national phase application of International Application No. PCT/US2021/070266, filed Mar. 11, 2021, which claims priority to U.S. Patent Application No. 62/991,780, filed Mar. 19, 2020, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, embodiments, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
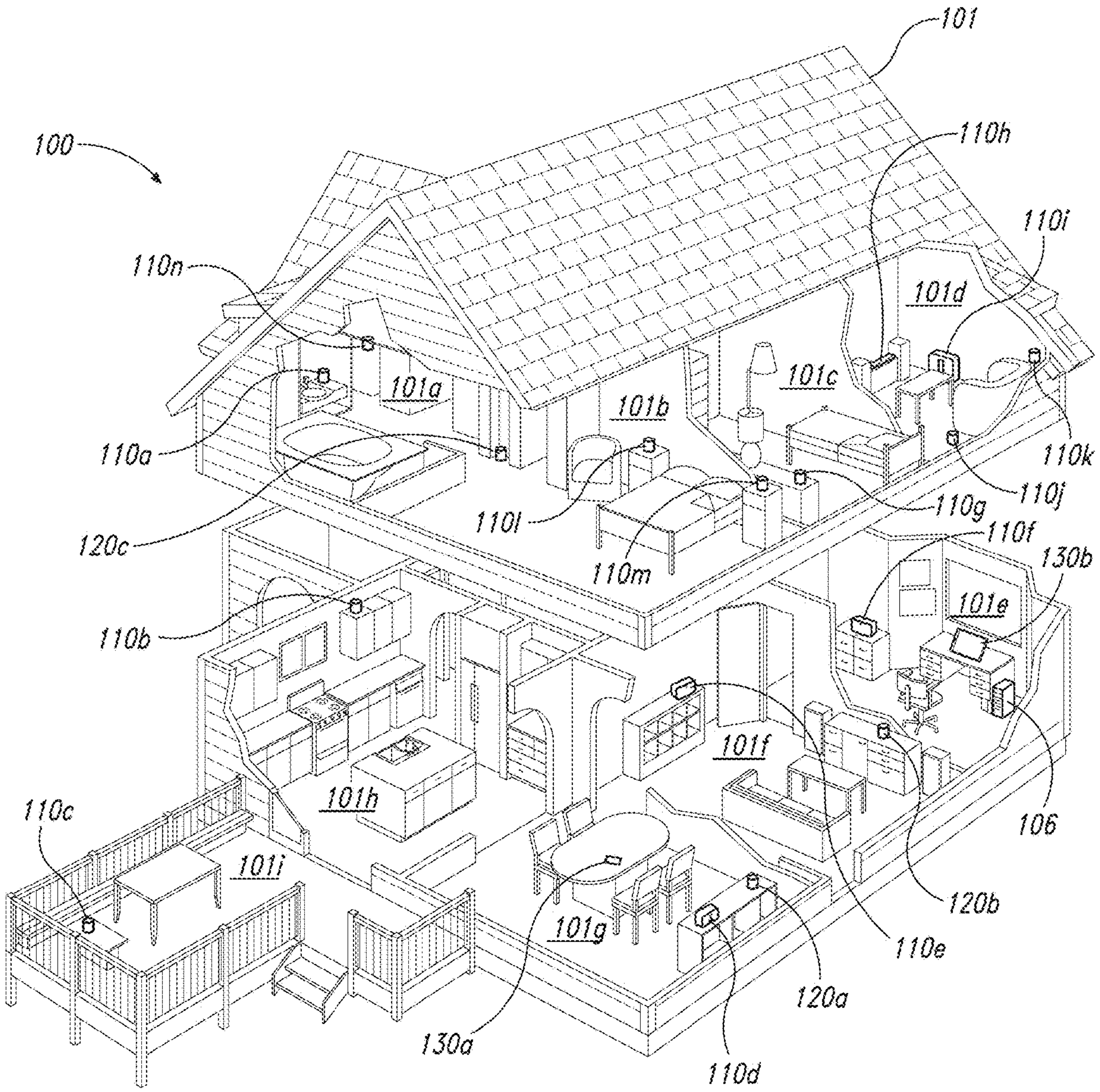
FIG. 1A is a partial cutaway view of an environment having a media playback system configured in accordance with examples of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Video subscription services (e.g., Comcast®, Dish®, DirectTV®, and other cable/satellite providers) typically require a dedicated set-top box or related hardware to provide video content to a user's video display. These set-top boxes are typically used only to output a standard video signal and user interface (UI), and commonly present a number of issues for users. For example, such hardware (i) can have a relatively short life-span due to maintenance issues or necessary updates, thereby requiring frequent replacement, (ii) may need to be reprovisioned whenever a user cancels or changes their video subscription service plan or moves the hardware to another video display, and (iii) often requires the user to pay a monthly rental fee. For these and other reasons, such hardware is often perceived by the user as being largely unnecessary and not contributing to enhancing the user's listening or viewing experience of video content. Additionally, such hardware adds a significant cost for the video subscription services due to maintenance and customer service obligations.

Examples of the disclosed technology address at least some of the above described issues associated with such hardware, e.g., by incorporating aspects and features provided via the previously described hardware into a playback device. As explained in more detail elsewhere herein, some examples of the disclosed technology relate to devices, systems, and/or methods for creating a UI that enables a user to obtain the content provided from video subscription services, as well as other traditional content providers (e.g., Netflix®, Hulu®, Amazon Prime®, HBO®, etc.), via a single audio playback device connected to a video-display unit. In addition to providing some or all of the features provided via the above-described hardware, playback devices in accordance with examples of the disclosed technology also provide an enhanced experience with regard to streaming audio-visual content. For example, in some instances the disclosed technology allows multiple users to access a single playback device (e.g., with authentication credentials), and thereby access a user-specific UI stored in a cloud network that provides access to a plurality of media services and/or media content providers whose media content can be streamed via the playback device.

In some examples, a method for playing back audio-visual content can include receiving, at an audio playback device communicatively coupled to a video display device, user authentication credentials associated with a user account, and causing the video display device to display a graphical user interface that includes a plurality of media services associated with the user account. After receiving a user selection for media playback of audio-visual content from a selected media service, a request for such content can be transmitted from the audio playback device to the selected media service. Subsequently, the audio playback device can receive audio content and video content of the audio-visual content, and playback the audio content of the audio-visual content while the video display device synchronously plays back video content of the audio-visual content. In some examples, the audio playback device may split the audio content and video content of the audio-visual content into separate signals, and subsequently transmit only the video content to the video display device. In some examples, the audio playback device may transmit both the audio content and video content to the video display device, which may separate the audio content into a separate signal and transmit it to the audio playback device.

Examples of the disclosed technology may present multiple advantages over conventional related technology. For example, unlike conventional technologies previously described which are linked to a single device or user, examples of the disclosed technology may enable use by any user having authentication credentials. Accordingly, such examples would enable a single device to service a plurality of users. Additionally, such examples would (i) eliminate the need for users to have set-top boxes or related hardware connected to their video displays, thereby also eliminating the need for users to physically exchange, return, or replace the hardware, e.g., after canceling or changing video subscription services, (ii) eliminate or reduce the amount of resources video subscription services would need to provide to maintain and operate the hardware. Additionally, because the UI can facilitate access to applications hosted remotely (e.g., in remote cloud servers), certain applications (e.g., a Netflix® "app," an HBO GO® "app," etc.) can be managed and run remotely while permitting access by a user via a local playback device. As a result, such applications can be maintained and updated via the remote servers, eliminating the need for a user to locally update software associated with such applications. Additionally, embodiments of the disclosed technology enable the media content provided via the video subscription services to be streamed directly to audio playback device, thereby enhancing the listening and overall viewing experience of the user. Amongst other benefits, this offers convenience for the users, and decreased maintenance costs for the video-subscription services or other media providers.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and/or examples are described below in the context of a home environment, the technologies described herein may be implemented in other types of environments. In some examples, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
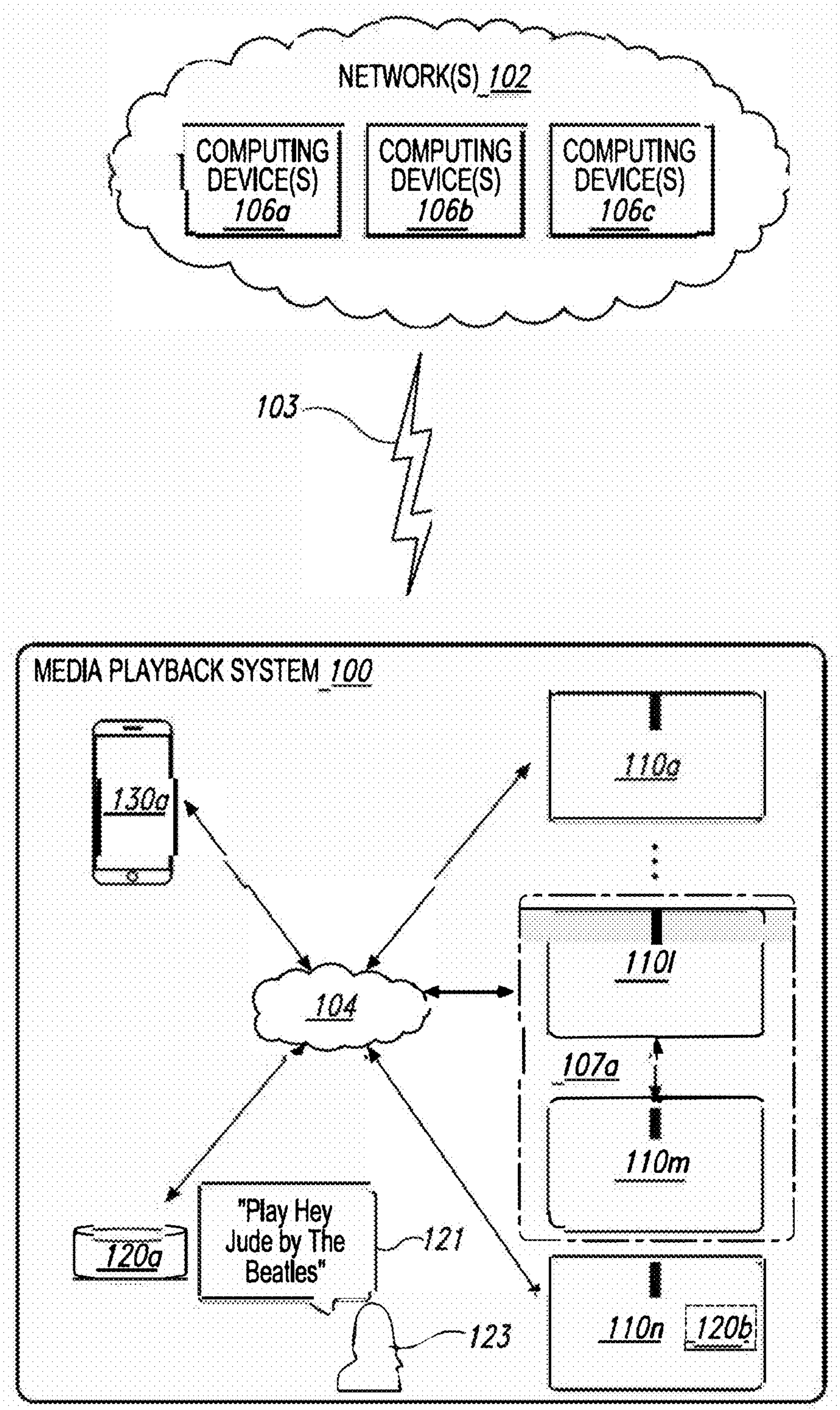
FIG. 1B is a schematic diagram of the media playback system of FIG. 1A and one or more networks.

FIG. 1B is a schematic diagram of the media playback system 100 and a cloud network 102. For case of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for example, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
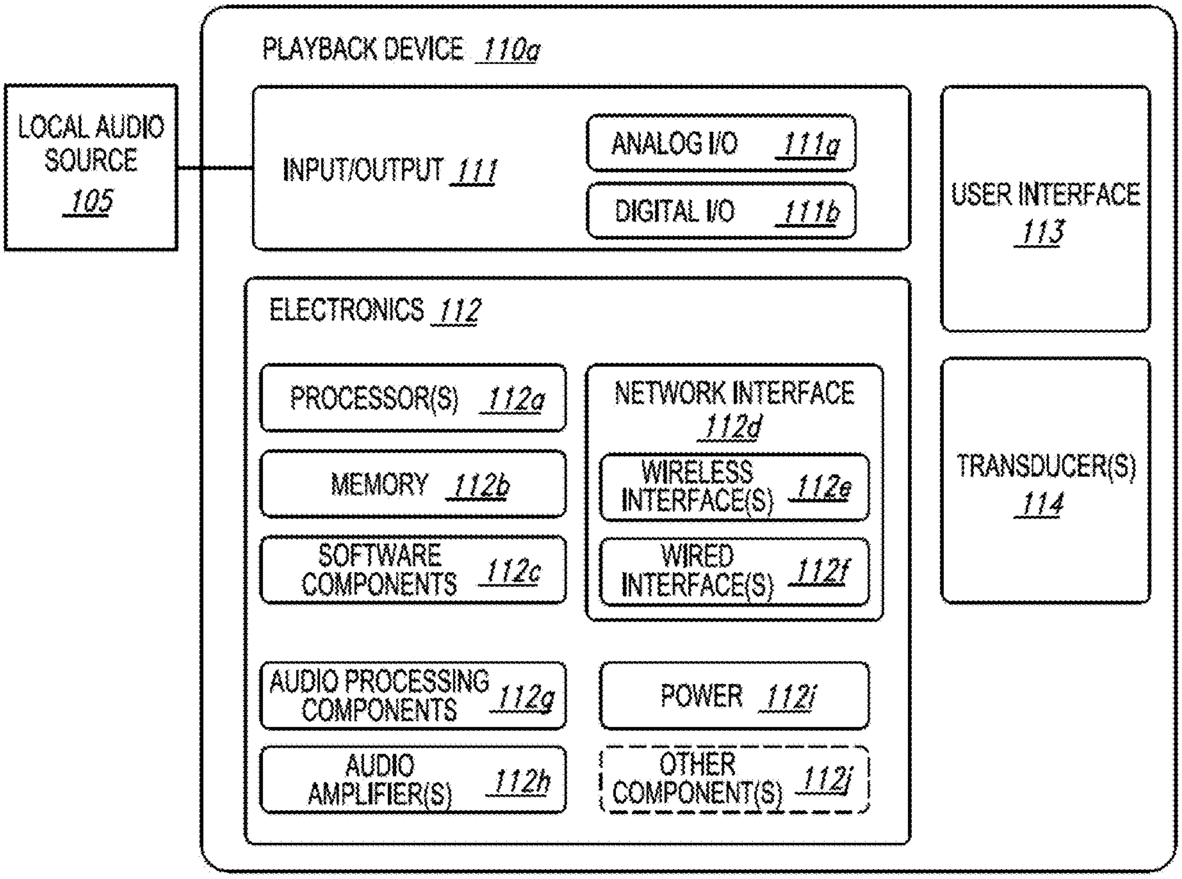
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b*(e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

As described in more detail below, in some examples, the playback device 110*a* can be communicatively coupled to a video display device (e.g., a television, projector, etc.) for playback of audio content in synchrony with video content played via the video display device. In such examples, the playback device 110*a* can be configured to transmit at least a video component of audio-visual content to the video display device, for example via the input/output 111. In operation, the playback device 110*a* may receive audio-visual content from one or more remote computing devices (e.g., via the wireless interface(s) 112*e* or wired interface(s) 112*f*). The playback device 110*a* can be configured to transmit at least the video portion of the audio-visual content to the video display device. Such transmission from the playback device 110*a* to the video display device can be wired or wireless. In some examples, the playback device 110*a* may transmit both the audio and video components of the audio-visual content to the video display device (e.g., via input/output 111). The video display device may then transmit the audio component back to the playback device 110*a* (e.g., the video display device may serve as the local audio source 105) for synchronous playback. In other examples, the playback device 110*a* may split the received audio-visual content and transmit only the video component of the audio-visual content to the video display device for synchronous playback.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone). Additional examples include operations causing the playback device 110*a* to split received audio-visual content into audio content (for playback via the playback device 110*a*) and video content (for playback via a coupled video display device).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
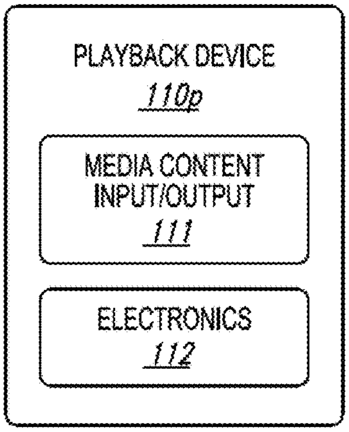
FIG. 1D is a block diagram of a playback device.

By way of illustration, SONOS, Inc. presently offers (or has offered) for sale certain playback devices including, for example, a "SONOS ONE," "MOVE," "PLAY: 5," "BEAM," "PLAYBAR," "PLAYBASE," "PORT," "BOOST," "AMP," and "SUB." Other suitable playback devices may additionally or alternatively be used to implement the playback devices of examples disclosed herein. Additionally, one of ordinary skilled in the art will appreciate that a playback device is not limited to the examples described herein or to SONOS product offerings. In some examples, one or more playback devices 110 comprises wired or wireless headphones (e.g., over-the-ear headphones, on-car headphones, in-car carphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
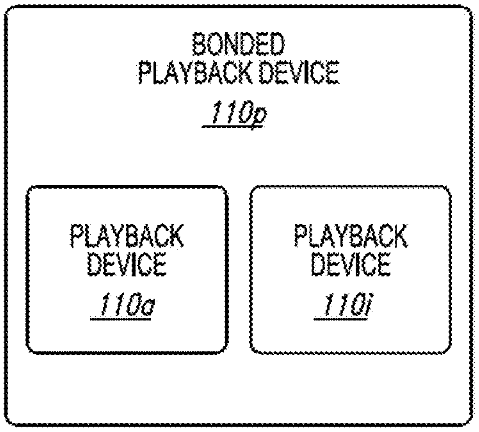
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
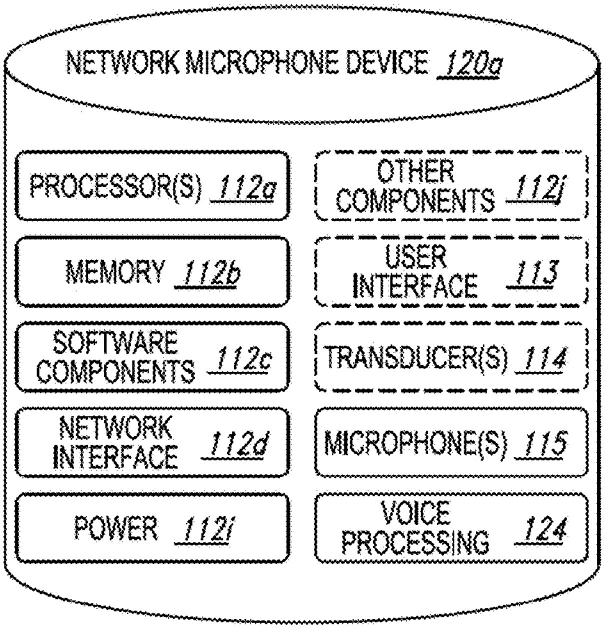
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for example, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
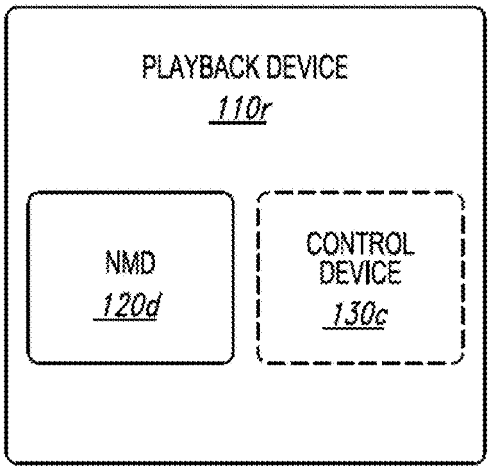
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
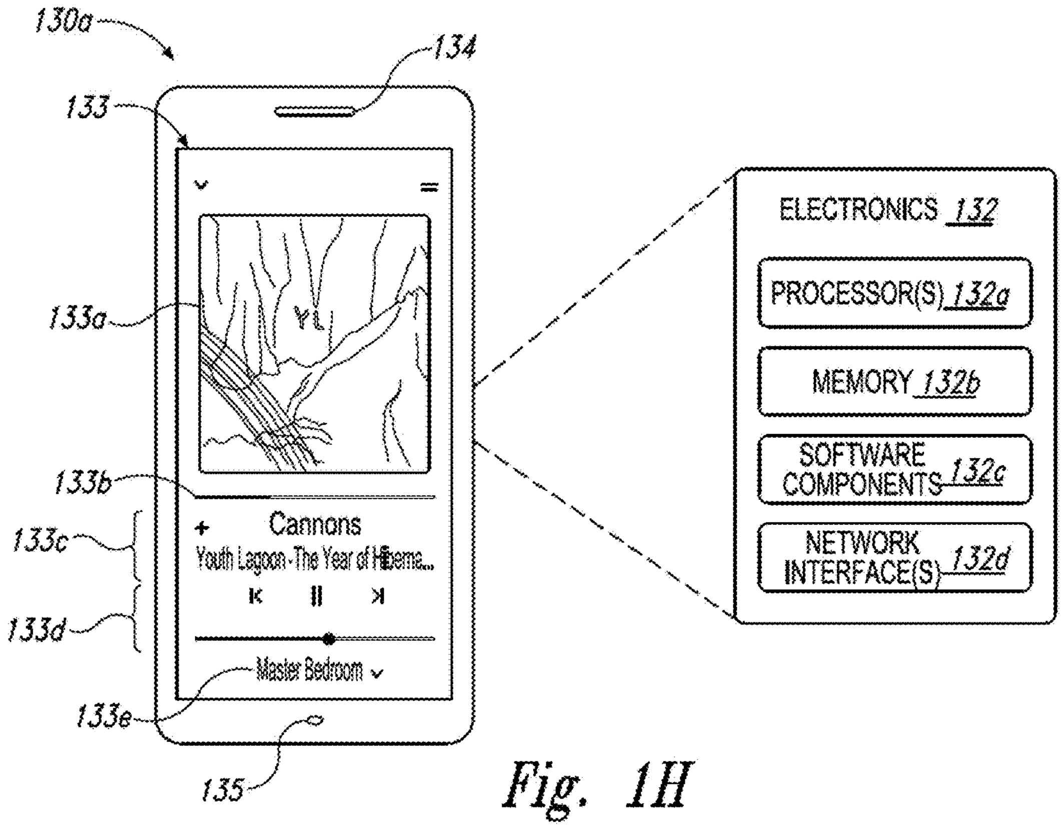
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface **132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110** to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art **133*a* (e.g., album art, lyrics, videos), a playback status indicator 133*b* (e.g., an elapsed and/or remaining time indicator), media content information region 133*c*, a playback control region 133*d*, and a zone indicator 133*c*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133** comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device **130*a*. In some examples, the one or more speakers comprise individual transducers configured to correspondingly output low frequencies, mid-range frequencies, and/or high frequencies. In some examples, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135**.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device **130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133** (e.g., a touch screen) without any speakers or microphones.

III. Example Systems and Devices

Figure 2A:
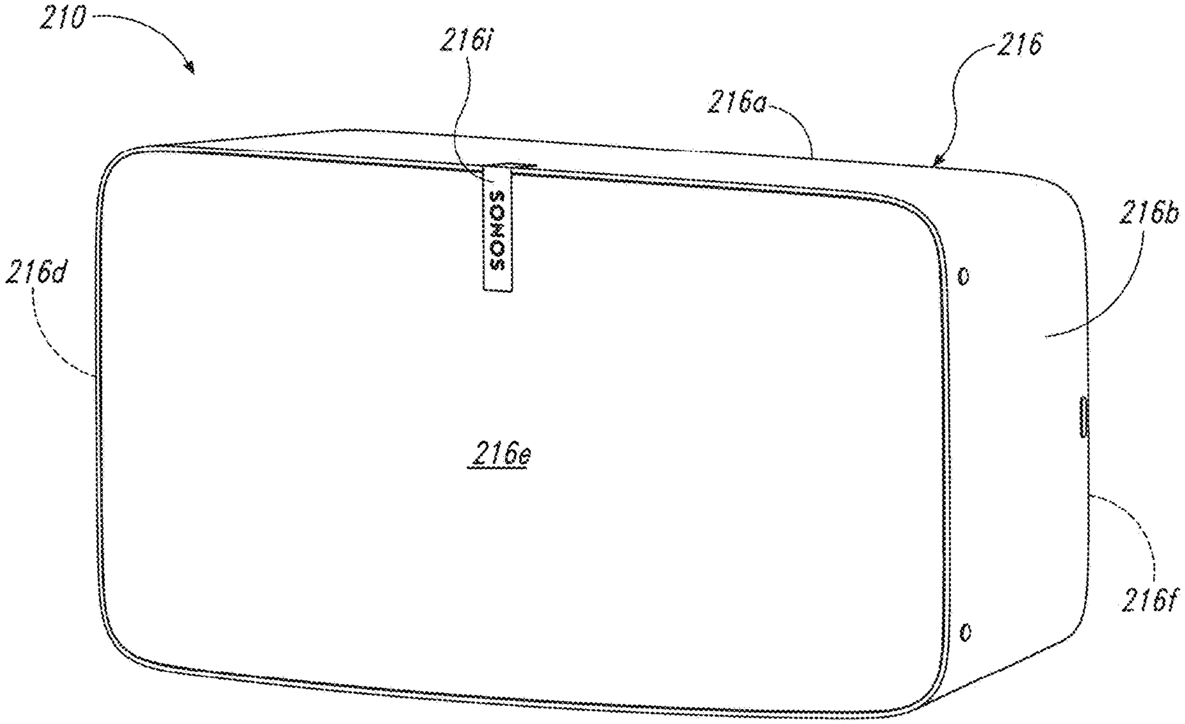
FIG. 2A is a front isometric view of a playback device configured in accordance with examples of the disclosed technology.
Figure 2B:
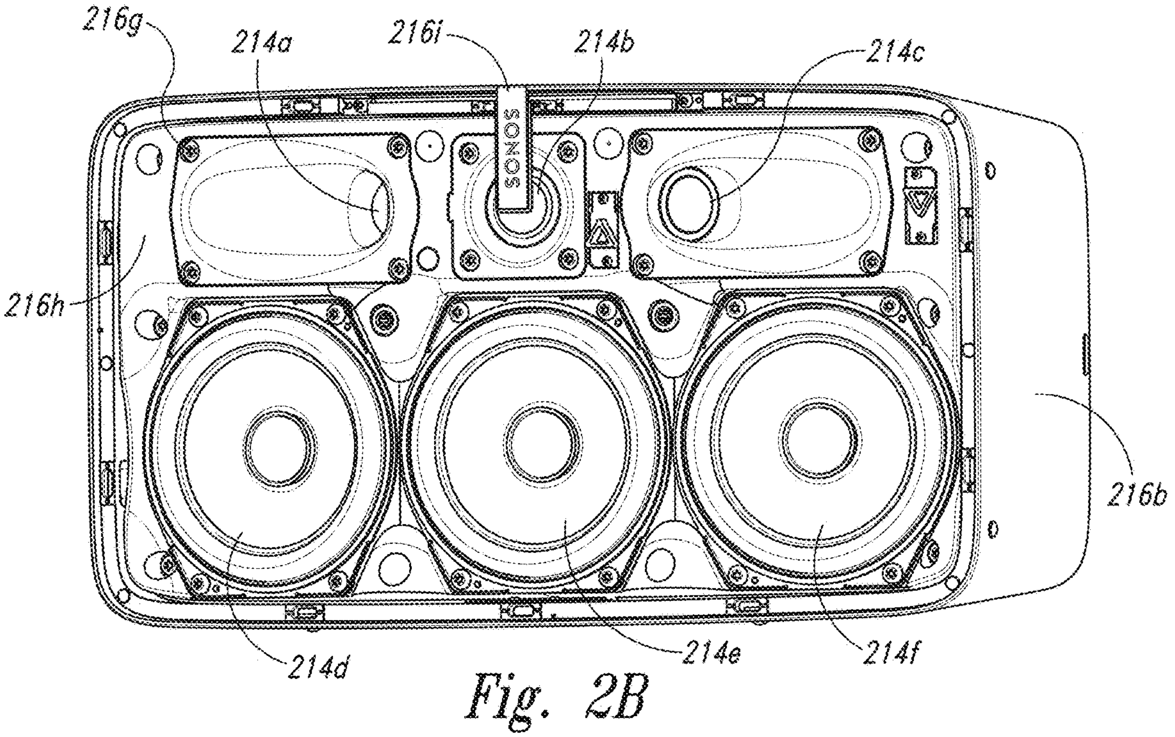
FIG. 2B is a front isometric view of the playback device of FIG. 2A without a grille.
Figure 2C:
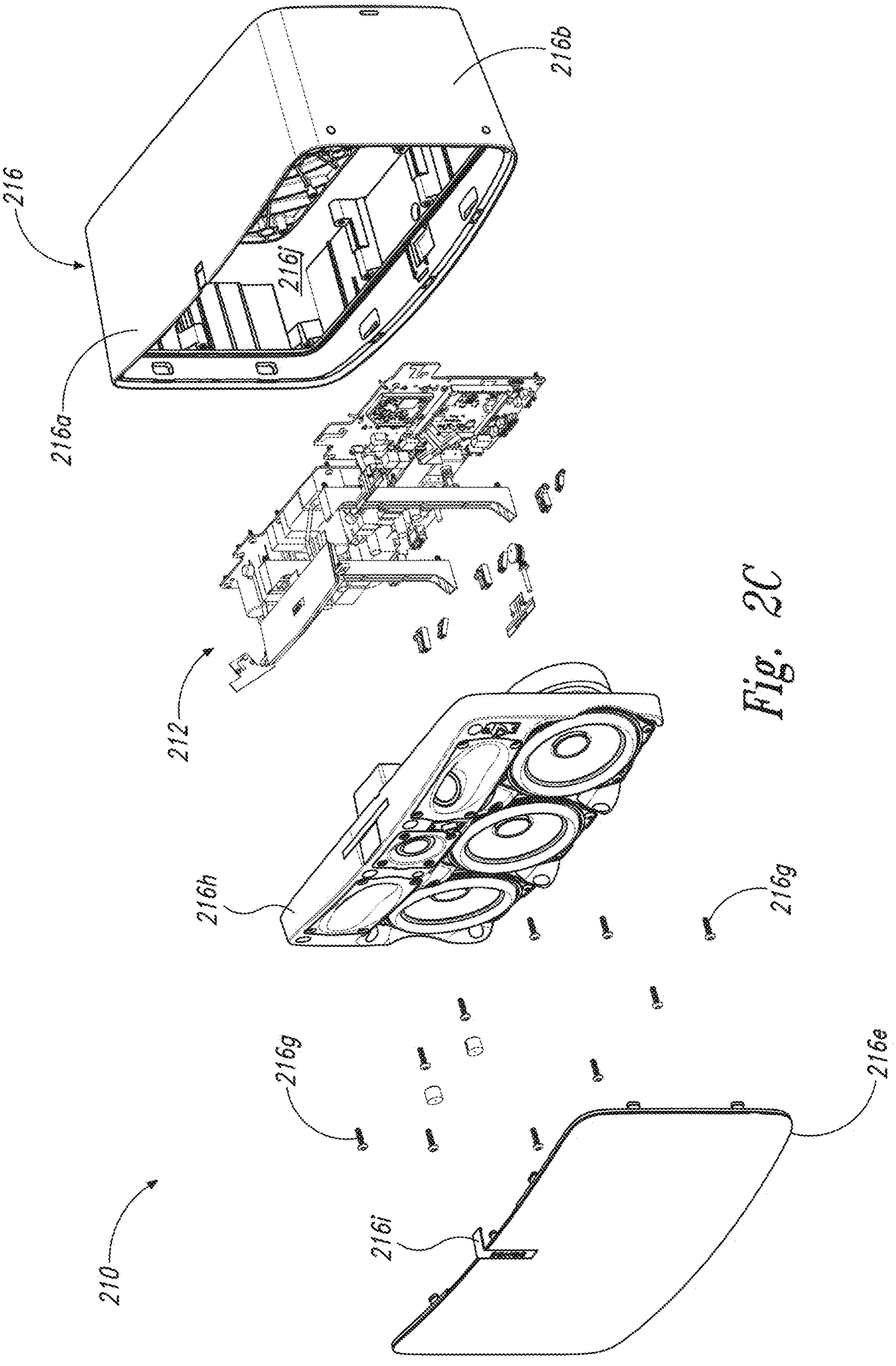
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille **216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clfips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214** for playback.

The transducers 214 are configured to receive the electrical signals from the electronics 112, and further configured to convert the received electrical signals into audible sound during playback. For instance, the transducers **214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210**.

In the illustrated example of FIGS. 2A-2C, a filter **216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214**.

Figure 3:
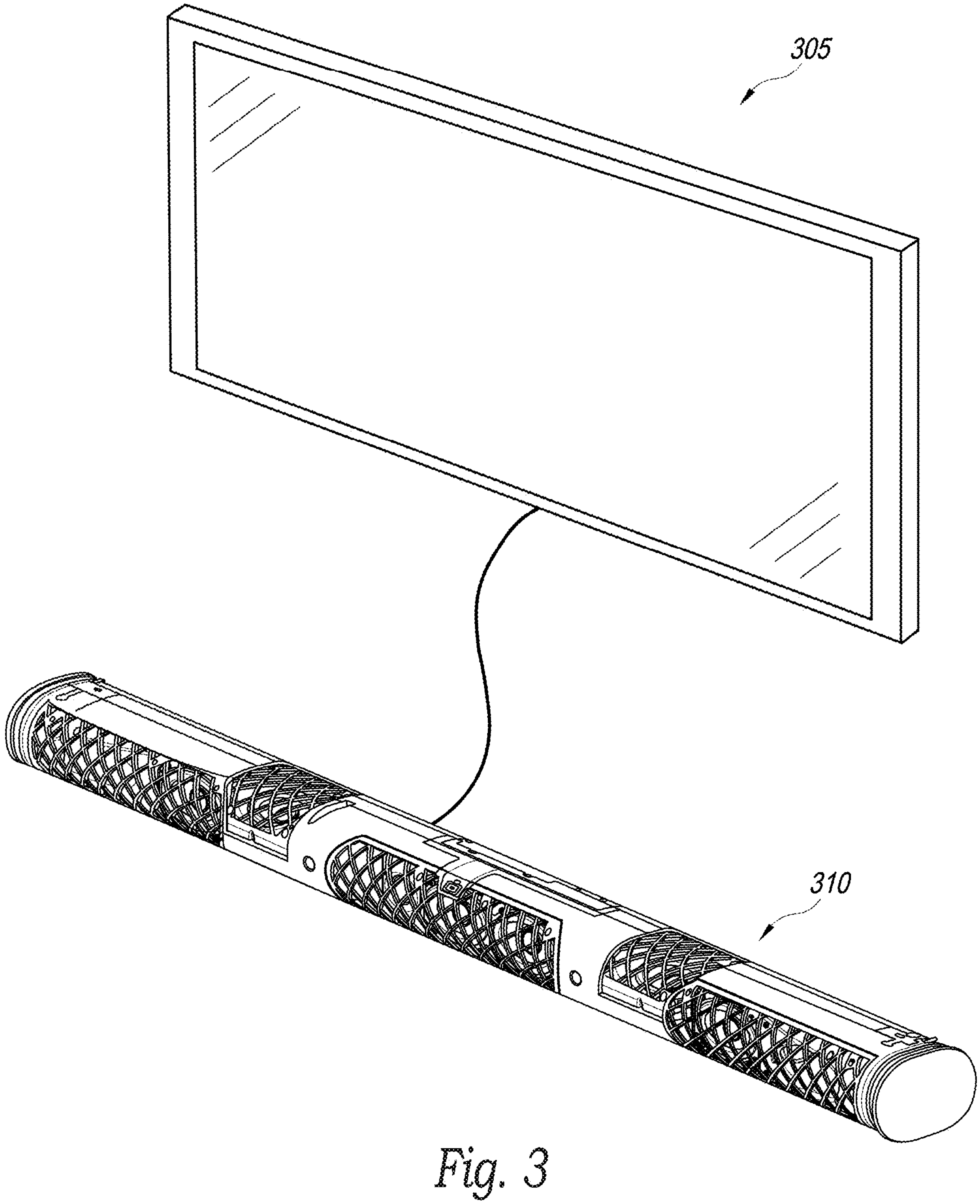
FIG. 3 is a schematic view of a playback device communicatively coupled to a video display device in accordance with examples of the disclosed technology.

FIG. 3 is a schematic view of a playback device 305 in communication with a video display device 310 in accordance with examples of the disclosed technology. In some examples, the playback device 305 (e.g., a soundbar or other suitable playback device) can be configured to play back audio accompanying video that is played back via the separate video display device 310. In the illustrated example, the video display device 310 is a television, and there is a physical connection (e.g., wire, cable, etc.) that carries audio and/or video input from playback device 305 to the display device 310, or vice versa. In some examples, there may be multiple physical connections between the playback device 305 and the display device 310, e.g., such that the playback device 305 can send and receive video and audio signals to and from the display device 310. In other examples, a wireless signal (e.g., Wi-Fi, Bluetooth) connects the display device 305 to the playback device 310 without a wire or other physical connection between the playback device 305 and the display device 310. In some examples, instead of or in addition to a television, the video display device can be, for example, a streaming device (e.g., Apple TV®, Roku®, Google Chromecast®, etc.), a Blu-ray player, or any other such device that simultaneously sends video content to a display device such as a projector or television and also sends audio content to accompanying audio devices (e.g., playback device 305). Although a soundbar is shown in this example, the playback device 305 can take any suitable form, including multiple different playback devices that have been grouped together for synchronous playback, such as in a home theatre surround-sound configuration.

In operation, the video display device 310 can provide audio data to the playback device 305 for audio playback. Additionally or alternatively, the playback device 305 can provide audio data and video data to the video display device 310. The audio data may be provided in any suitable formats, including, for instance both uncompressed audio (e.g. audio encoded using pulse-code modulation (PCM)) and compressed audio (e.g., audio encoded using Dolby Digital, Dolby Digital Plus, Dolby TrueHD, Dolby Atmos, DTS Digital Surround, DTS-HD High Resolution, DTS-HD Master Audio, or other encoding scheme that involves compression of the audio data).

Figure 4:
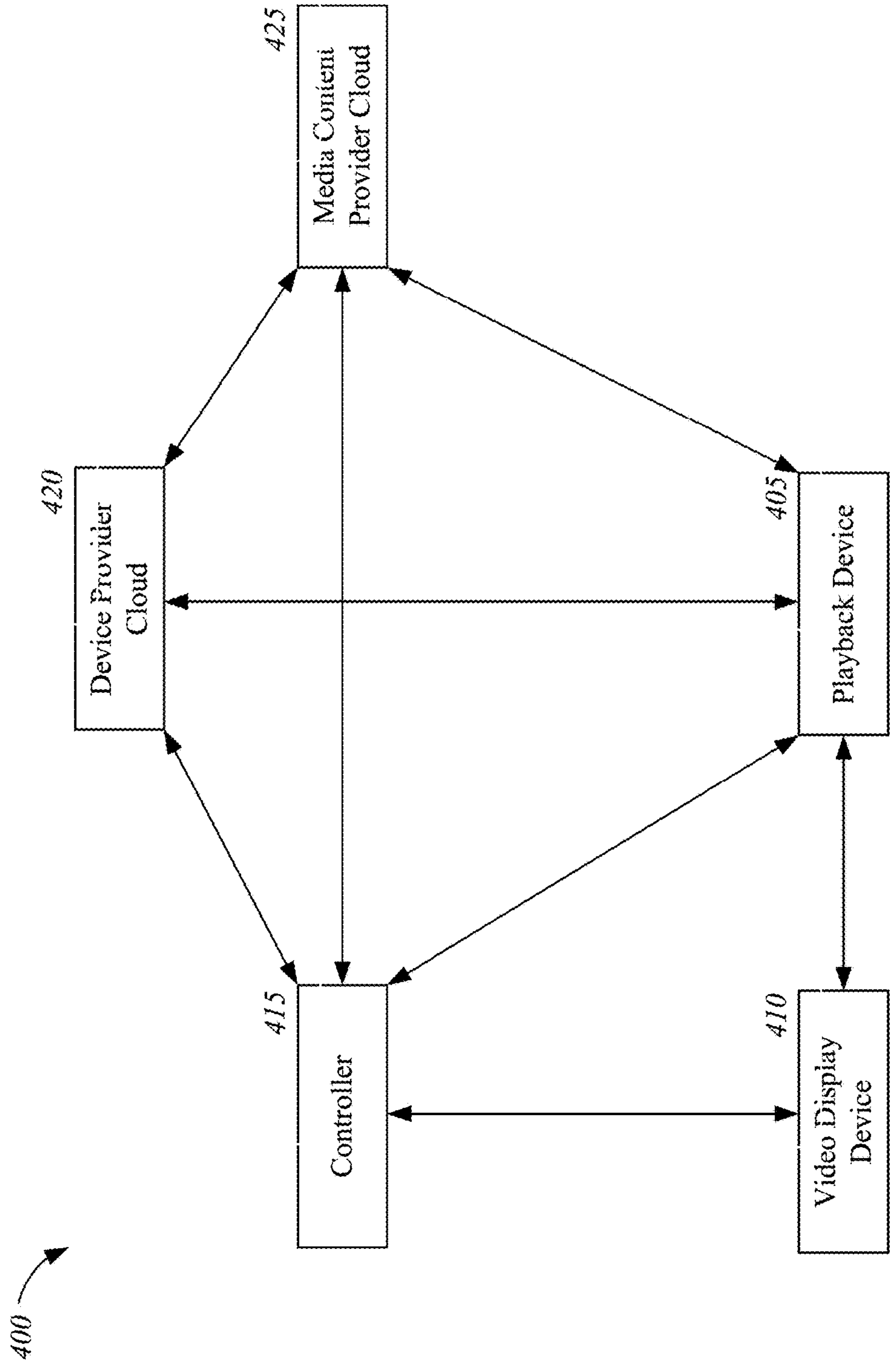
FIG. 4 is a schematic block diagram illustrating communication within a system configured to provide audio-visual media content, in accordance with examples of the disclosed technology.

FIG. 4 is a schematic block diagram illustrating communication within a system 400 configured to provide audio-visual media content, in accordance with examples of the disclosed technology. The system 400 can include multiple platforms (e.g., devices, parties, etc.), including a playback device 405, a video display device 410, a controller 415, a device provider cloud 420, and a media content provider cloud 425. The playback device 405 can generally correspond to the audio playback device 305 described with reference to FIG. 3, or any playback device described elsewhere herein (e.g., with reference to FIGS. 1A-3). As shown in FIG. 4, the playback device 405 can be communicatively coupled to each of the video display device 410, the controller 415, the device provider cloud 420, and the media content provider cloud 425 via a wireless or wired network (as described elsewhere herein).

The video display device 410 can generally correspond to the video display device 310 described above with reference to FIG. 3. As shown in FIG. 4, the video display device 410 can be communicatively coupled to each of the playback device 405 and the controller 415 via a wireless or wired network (as described elsewhere herein). As such, the video display device 410 can be indirectly communicatively coupled to the device provider cloud 420 and the media content provider cloud 425 via the controller 415 and/or playback device 405. In some examples, the video display device 405 may be directly communicatively coupled to the device provider cloud 420 and/or the media content provider cloud 425.

The controller 415 can correspond to a device, software, or platform that enables the user to select media content, and in some instances view media content. In some examples, the controller 415 can comprise a smartphone, tablet, computer, voice input device, remote, or similar hardware. As shown in FIG. 4, the controller 415 can be communicatively coupled to each of the playback device 405, the video display device 410, the device provider cloud 420, and/or the media content provider cloud 425 via a wireless or wired network (as described elsewhere herein). In some examples, the controller 415 may be coupled only to some but not all of these components. For example, the controller 415 may be communicatively coupled to the playback device 405 and/or the video display device 410, and yet not be in direct communication with the device provider cloud 420 and/or the media content provider cloud 425.

The device provider cloud 420 can correspond to a cloud network affiliated with the playback device 405 or manufacturer thereof. The device provider cloud 420 can include features generally similar or identical to those of the cloud network 102 previously described. For example, the device provider cloud 420 can include one or more computing devices, which may each have individual computers or servers with access to a media streaming server storing audio content and/or audio-visual content. In some examples, the device provider cloud 420 may serve as an intermediary platform between the user and the media services or media content of a plurality of media content providers. Additionally or alternatively, the device provider cloud 420 may have a graphical user interface affiliated therewith or the playback device 405 that can be provided to the user (e.g., via the video display device 410) and which displays the media content of the media content providers. As shown in FIG. 4, the device provider cloud 420 can be communicatively coupled to each of the playback device 405, the controller 415, and/or the media content provider cloud 425. As such, the device provider cloud 420 can stream data (e.g., accessible media content, UIs, etc.) to the playback device 405, and/or to the video display device 410 via the playback device 405 or controller 415.

The media content provider cloud 425 can correspond to a cloud network affiliated with one or more media content providers, such as the video-subscription services (e.g., Comcast®, Dish®, DirectTV®, and other cable/satellite providers) and other video content providers (e.g., Netflix®, Hulu®, Amazon Prime®, HBO®, etc.). In some examples, the media content provider cloud 425 can include computing devices associated with a content delivery network, which serves as an intermediary between content providers (e.g., Netflix®) and a viewer. The media content provider cloud 425 can include features generally similar or identical to those of the cloud network 102 previously described. For example, the media content provider cloud 425 can include one or more computing devices, which may each have individual computers or servers with access to a media streaming server storing audio content and/or audio-visual content. As shown in FIG. 4, the media content provider cloud 425 can be communicatively coupled to each of the playback device 405, the controller 415, and the media content provider cloud 425. As such, the media content provider cloud 425 can stream data (e.g., accessible media content, UIs, signals, etc.) directly to the playback device 405, or indirectly to the playback device 405 via the device provider cloud 420. Moreover, the media content provider cloud 425 can be indirectly communicatively coupled to the video display device 410 via the controller 415 and/or playback device 405. In some examples, the media content provider cloud 425 may be directly communicatively coupled to the video display device 410.

Figure 5A:
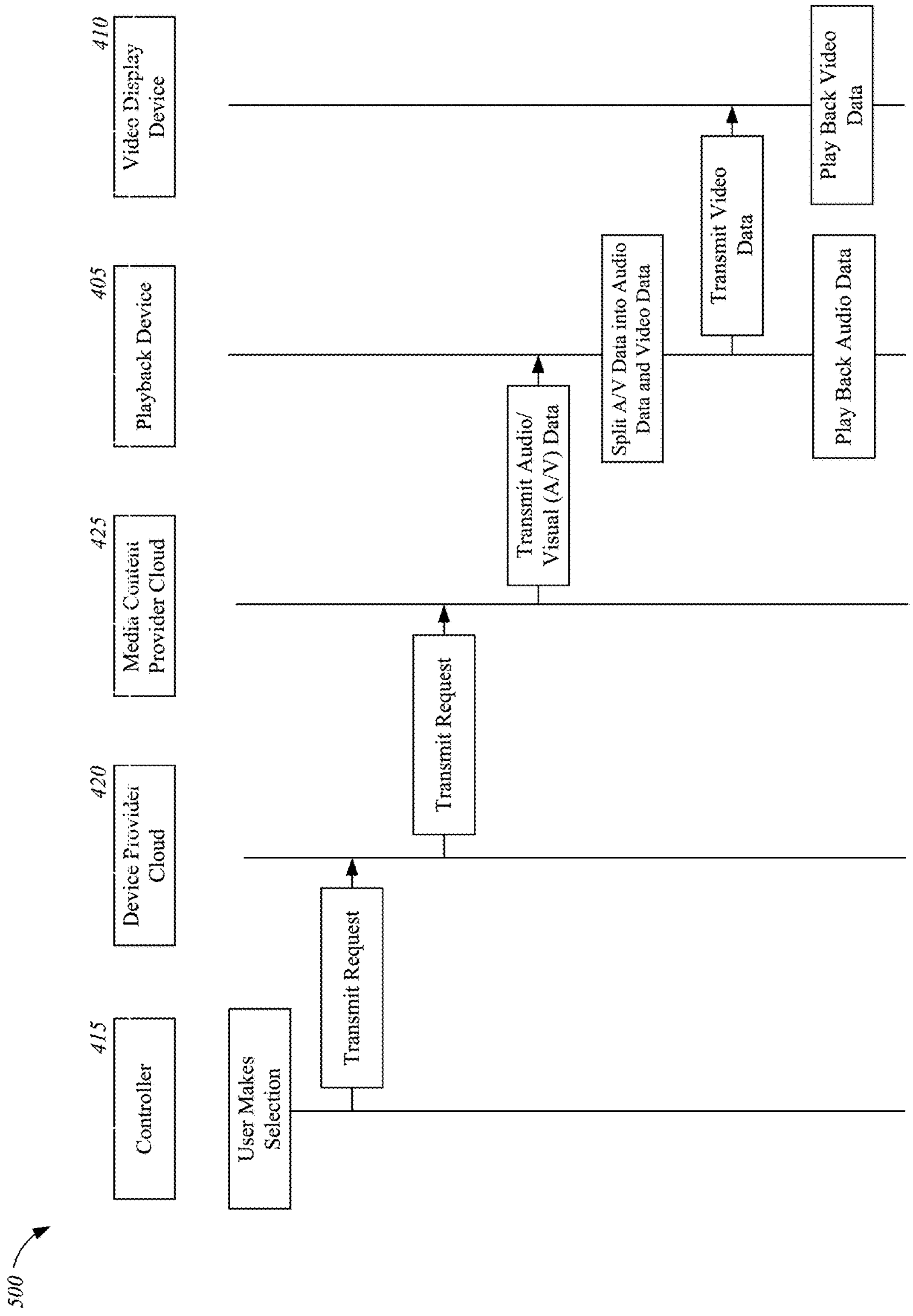
FIGS. 5A and 5B are schematic message flow diagrams for a system for playing back audio-visual content, in accordance with examples of the disclosed technology.
Figure 5B:
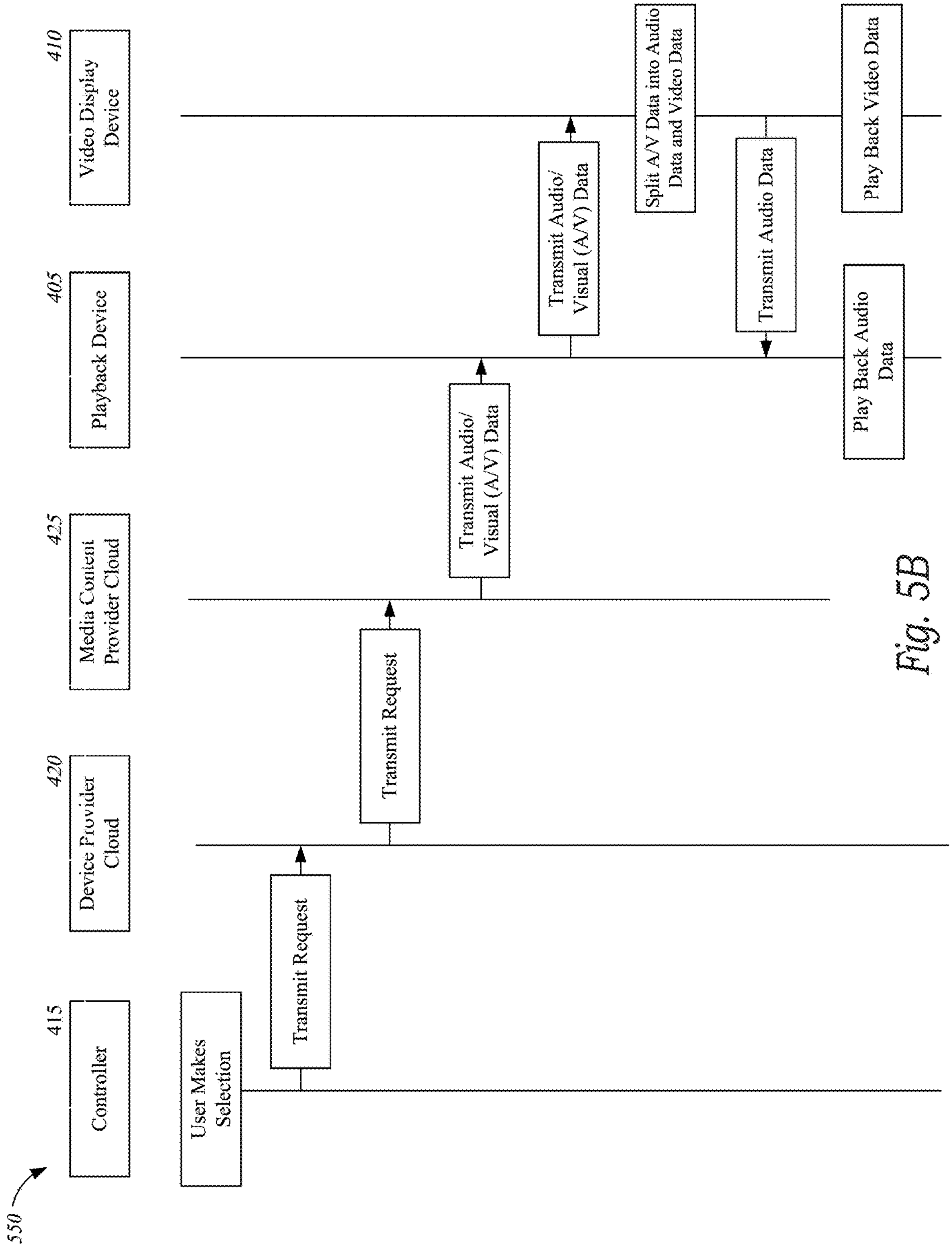

FIGS. 5A and 5B illustrate message flow diagrams for systems 500, 550 for playing back audio-visual content, in accordance with examples of the disclosed technology. Referring first to FIG. 5A, the system 500 includes the playback device 405, video display device 410, controller

415, device provider cloud 420, and the media content provider cloud 425 described with reference to FIG. 4.

As previously described, the controller 415 can enable a user to select media content available from media content providers via the device provider cloud 420 and/or media content provider cloud 425. In some examples, the controller 415 may select media content provided on a UI associated with the operator of the device provider cloud 420 and/or playback device 405, and therein be able access to a plurality of the media content providers for which the user has an account or authentication credentials. For example, the video display device 410 may display a UI to the user (e.g., based on signals received from the device provider cloud 420) that allows a user to select particular media content for playback. The UI can include, for example, icons, menus, or other graphics associated with particular applications that are associated with different media services. Additionally or alternatively, the UI may graphically display a Netflix® app or icon, an HBO® app or icon, and an Amazon Prime® app or icon via the video display device 410. The user may navigate the UI to select both a particular media content provider (e.g., Netflix®), and to select particular media content to be played back (e.g., "The Office"). Once selected, the media content may be transmitted (e.g., streamed) from the selected media content provider cloud 425 to the playback device 405 and/or the video display device 410 for playback to the user.

By providing the UI from the device provider cloud 420 to the playback device 405 and/or the video display device 410, the system 500 permits the particular software accessible via the UI to be executed and controlled in the device provider cloud 420. For example, a Netflix® app can be stored and run as a virtual instance via the device provider cloud 420, and the user may access and interact with the Netflix® app via the UI displayed via the video display device 410. One benefit of this configuration is that the particular applications (e.g., the Netflix® app) can be maintained and updated via the device provider cloud 420, thereby relieving the user of the responsibility for maintaining and updating any locally stored software associated with such media content providers.

As shown in FIG. 5A, once the user makes a selection, a request is made from the controller 415 to the device provider cloud 420, and subsequently to the media content provider cloud 425 to retrieve the selected media content. In some examples, the request corresponding to the user's selection of media content may be transmitted directly to the media content provider cloud 425 without being sent to the device provider cloud 420.

After receiving the request, the media content provider cloud 425 can respond by transmitting an audio/visual (A/V) data stream associated with the user's selection to the playback device 405. In some examples, the user's selection is provided from the media content provider cloud 425 directly to the playback device 405 and/or video display device 410 for subsequent playback. In such examples, the device provider cloud 420 serves as an intermediary between the controller 415 (or user) and the media content provider cloud 425 to transmit the user's request, but then enables the media content provider cloud 425, and therein the media content providers, to communicate directly to the playback device 405 and/or video display device 410 without the media content passing through the device provider cloud 420. As such, media content can be effectively streamed directly from the media content provider to the user, while the device provider cloud 420 still provides access (e.g., via the UI stored in the device provider cloud 420) to media content available from multiple media content providers. Such examples of the disclosed technology provide an enhanced ability to stream and experience media content, relative to conventional related technologies.

In the illustrated example shown in FIG. 5A, the playback device 405 receives the A/V data stream corresponding to the user's selected media content from the media content provider. In some examples, however, the A/V data stream can be received at the playback device 405 from the device provider cloud 420, which receives the A/V data stream from the media content provider cloud 425. Once received at the playback device 405, the playback device 405 can split the A/V data stream into a first data stream comprising audio data and a second data stream comprising video data. In such examples, the video data, and in some instances only the video data, can subsequently be transmitted to the video display device 410, which is communicatively coupled to the playback device 405. In some examples, the video data may be transmitted to the video display device 410 wirelessly or via a wired connection (e.g., via a High-Definition Multimedia Interface (HDMI) cable) configured to transmit video content. Subsequently, the playback device 405 can playback the audio content of the A/V data stream while the video display device 410 synchronously plays back the video content of the A/V content.

FIG. 5B illustrates another example message flow for a system 550 for playing back audio-visual content, in accordance with examples of the disclosed technology. FIG. 5B includes features and functionality generally similar to those described with reference to system 500 and FIG. 5A. However, message flow within system 550 differs from that within system 500 in that the A/V data received at the playback device 405 from the media content provider cloud 425 is transmitted from the playback device 405 to the video display device 410, and is split into the first data stream comprising audio data and the second data stream comprising video data at the video display device 410. In such examples, the audio data, and in some instances only the audio data, can subsequently be transmitted from the video display device 410 to the playback device 405, which is communicatively coupled to the video display device 410. In some examples, the A/V data may be transmitted from the playback device 405 to video display device 410 via a first wired connection (e.g., a first HDMI cable) configured to transmit both audio and video content, and the audio data may be transmitted from the video display device 410 to the playback device 405 via a second wired connection (e.g., a second HDMI cable) different than the first wired connection and configured to transmit audio content.

Figure 6:
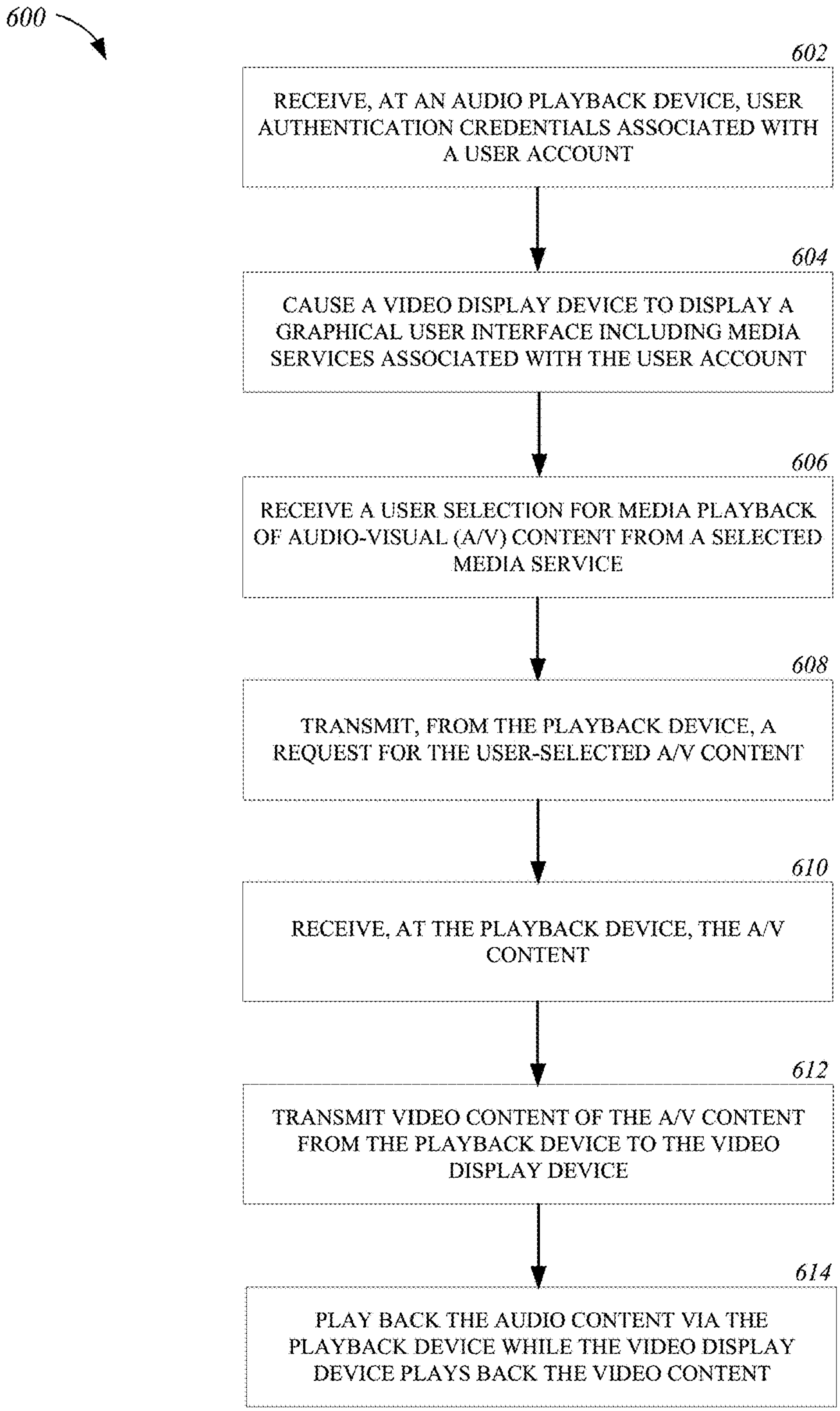
FIGS. 6 and 7 are flow diagrams of methods for decoding audio data in accordance with examples of the disclosed technology.

FIG. 6 is a flow diagram illustrating a method 600 for playing back audio-visual content in accordance with examples of the disclosed technology. The method 600 can comprise receiving, at an audio playback device (e.g., the playback device 405), user authentication credentials associated with a user account (process portion 602), and causing a video display device (e.g., the video display device 410) to display a graphical user interface (GUI) including media services associated with the user account (process portion 604). As described elsewhere herein, the GUI may be provided directly to the video display device, or indirectly to the video display device via the playback device. The user authentication credentials may provide access to the GUI, which in turn may allow access to media services (e.g., content originating from a plurality of media content providers). The GUI may be associated with (e.g., provided, operated, or owned by) the owner/manufacturer of the playback device, and the media content providers may be Netflix®, Hulu®, Amazon Prime®, HBO®, etc. In such examples, the user may have an account or authentication credentials for each of the media content providers, and the GUI associated with the playback device can serve as a central platform to experience the different media content providers in a single GUI.

In some examples, the GUI is provided via a cloud network (e.g., the device provider cloud 420) associated with the playback device. In such examples, the GUI is not stored locally on the playback device. Moreover, in such examples the GUI can be provided to any video display device communicatively coupled to a playback device for which the user has a user account and/or authentication credentials. That is, each playback device can be affiliated with any user account and/or authentication credentials, and thus can be utilized by multiple users. Stated differently, each playback device need not be permanently associated with only a single user account. This ability to be linked to multiple users can mitigate issues associated with conventional related technologies (e.g., traditional set-top boxes) previously described. For example, unlike the traditional set-top boxes, examples of the disclosed technology can eliminate a need for users to return equipment after canceling or changing services (e.g., switching from one video subscription service to another). Additionally, since the GUI is stored in the cloud, any updates to the GUI or affiliated features can be made in the cloud and distributed to the individual playback devices.

The method 600 can further comprise receiving a user selection for media playback of audio-visual (A/V) content from a selected media service (process portion 606), and transmitting a request for the user-selected A/V content from the playback device (process portion 608). The request may be transmitted from the playback device to the selected media service directly, or to the selected media service indirectly via a cloud network (e.g., the device provider cloud 420) associated with the GUI. The user selection may be made via a remote controller (e.g., the controller 415) unaffiliated with the playback device and/or media service.

In some examples, the user selection can include a first user selection (e.g., from a first user) and a second user selection (e.g., from a second different user). The first and second users can be in different locations (e.g., on different wireless networks) and may each be accessing or viewing the GUI on different video display devices. As such, examples of the disclosed technology can enable multiple users to access the GUI described herein (i) simultaneously, (ii) at different locations, and/or (iii) via different video display devices. Moreover, user authentication credentials may enable multiple users (e.g., different individuals of a family) to access media content associated with the available media services separate from the other users of the authentication credentials.

The method 600 can further comprise receiving the A/V content at the playback device 610 (process portion 610). As described elsewhere herein, the A/V content can comprise a single bundle of data, e.g., a single stream comprising audio and video data and not first and second streams comprising audio data and video data respectively. Transmitting A/V content in such a manner can enable more efficient transmission of the content, relative to transmitting the same content as separate audio and video streams.

The method 600 can further comprise transmitting video content of the A/V content from the playback device to the video display device (process portion 612). In such examples, the video content is separated from the rest of the A/V content (e.g., from the audio content of the A/V content) via the playback device, and transmitted to the video display device after the split. In such examples, the audio content of the A/V content remains with the playback device. Splitting the A/V content into respective audio content and video content streams at the playback device may be beneficial in those instances when a lower-capability video display device lacks the ability to split the A/V content in a similar manner. Such lower-capability video display devices may previously have been unable to be communicatively coupled to the playback device and stream A/V content in the manner described herein. Accordingly, examples of the disclosed technology enable playback devices to be operated with certain lower-capability video display devices that previous conventional technologies could not. The method 600 can further comprise playing back the audio content via the playback device while the video display device synchronously plays back the video content (process portion 614).

Figure 7:
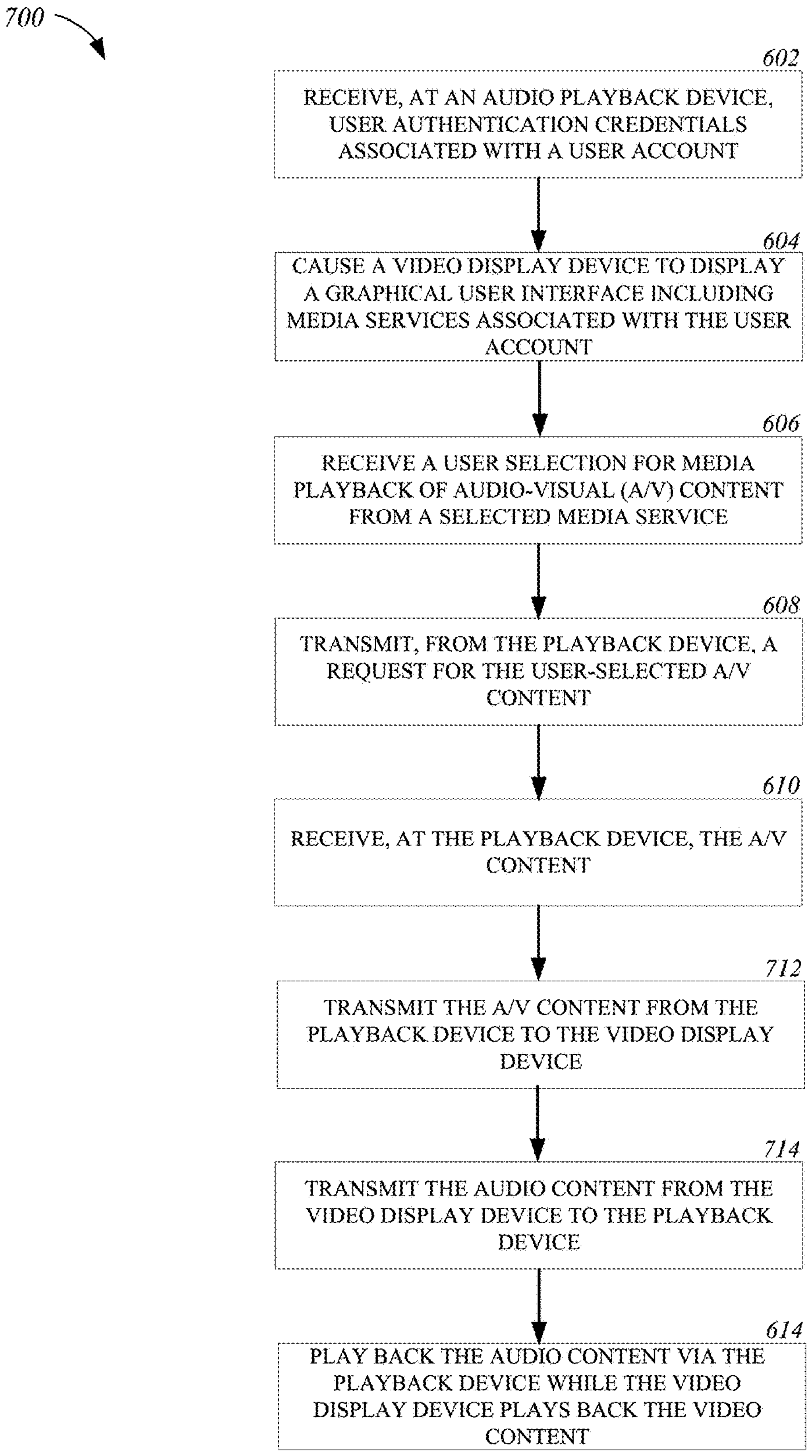

FIG. 7 is a flow diagram illustrating a method 700 for playing back A/V content in accordance with examples of the disclosed technology. The method 700 can comprise features and/or functionality generally similar to those of method 600. For example, the method 700 includes process portions 602, 604, 606, 608, 610 previously described. The method 700 can further comprise, after receiving the A/V content at the playback device, transmitting the A/V content from the playback device to the video display device (process portion 712), and then transmitting the audio content of the A/V content from the video display device to the playback device (process portion 714). In such examples, the video content is separated from the rest of the A/V content (e.g., from the audio content of the A/V content) via the video display device, and transmitted to the video display device after the split. In such examples, the video content of the A/V content remains with the video display device. The method 700 can further comprise playing back the audio content via the playback device while the video display device synchronously plays back the video content (process portion 614).

Examples of the present technology can have many advantages over related technologies currently available. As but one example, the present technology can enhance the listening and overall viewing experience for the user by improving playback of the audio content. For example, while some smart televisions do have the ability to stream media content, many of these televisions do not have audio return channels (ARC) or eARC, and thus are unable to provide a full-resolution audio signal to the user. Instead, such televisions often compress these audio signals (e.g., prior to passing them through an HDMI or similar cable) and thereby prevent the television or any audio playback device coupled to the television from providing enhanced sound (e.g., Dolby Digital, Dolby Digital Plus, Dolby TrueHD, Dolby Atmos, DTS Digital Surround, DTS-HD High Resolution, DTS-HD Master Audio, etc.). Examples of the present technology can mitigate this issue, e.g., by receiving the audio content (e.g., of the A/V content) and passing only the video content to the television (or video display device). In doing so, embodiments of the present technology maintain the quality of the incoming audio content, and thereby enhance the listening experience for the user. Additionally, examples of the present technology can enable user's to better utilize their lower-capability video display devices and related technology. Stated differently, examples of the present technology enable users to experience the most up-to-date technology via the audio playback devices of the present technology, while also still utilizing their lower capability video display devices.

Examples of the present technology may be particularly beneficial for the hospitality industry (e.g., hotels, vacation or short-term rentals, etc.). For instance, while smart televisions, Amazon Fire TV sticks, etc. present at such hotels or short-term rentals can allow users to access content by entering their user authentication credentials, these devices are often not linked to au audio playback device. As a result, and as previously described, the video displays to which these devices are connected often are unable to provide a full-resolution audio signal to the user, and thus cannot provide enhanced audio content to the user. Examples of the present technology mitigate this issue, while also serving a platform for which all of their media content services can be accessed with just the user's authentication credentials. These advantages of the present technology may also be realized in other commercial applications, such as video/audio streaming in commercial spaces (e.g., retail, hotel lobbies, exhibitions/conferences, etc.) and workspaces (e.g., offices). In addition to these advantages, there may also be other advantages associated with the audio playback device itself. For example, as described elsewhere herein, devices sharing a common network could share synchronized video and/or audio streaming.

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Additionally, features described with reference to one of the figures may be combined with and/or replace features described in other individual figures. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Examples of the disclosed technology are described below as numbered clauses (1, 2, 3, etc.) for convenience. These are provided as examples and do not limit the disclosed technology. It is noted that any of the dependent clauses may be combined in any combination, and placed into a respective independent clause. The other clauses can be presented in a similar manner.

Clause 1: A method of playing back audio-visual content, the method comprising: receiving, at an audio playback device communicatively coupled to a video display device, user authentication credentials associated with a user account; causing the video display device to display a graphical user interface that includes a plurality of media services associated with the user account; receiving a user selection for media playback of audio-visual content from a selected media service; transmitting, from the playback device, a request for the user-selected audio-visual content to the selected media service; receiving, at the playback device, audio content and video content of the audio-visual content; and playing back the audio content of the audio-visual content while the video display device synchronously plays back video content of the audio-visual content.

Clause 2: The method of any one of the Clauses herein, further comprising transmitting the video content from the playback device to the video display device.

Clause 3: The method of any one of the Clauses herein, further comprising: transmitting both the audio content and the video content of the audio-visual content to the video display device; and receiving, from the video display device, the audio content of the audio-visual content, wherein playing back the audio content of the audio-visual content while the video display device synchronously plays back video content of the audio-visual content occurs after receiving the audio content from the video display device.

Clause 4: The method of any one of the Clauses herein, wherein receiving, at the playback device, the audio content and the video content of the audio-visual content comprises receiving the audio content and the video content from the selected media service.

Clause 5: The method of any one of the Clauses herein, wherein receiving the user selection for media playback of audio-visual content from the selected media service comprises receiving the user selection from one or more remote computing devices unassociated with the selected media service.

Clause 6: The method of any one of the Clauses herein, wherein the graphical user interface is not stored locally on the playback device or the video display device.

Clause 7: The method of any one of the Clauses herein, wherein the user account is a first user account, the method further comprising: receiving, at the audio playback device communicatively coupled to a video display device, second user authentication credentials associated with a second user account; and causing the video display device to display a second graphical user interface that includes a second plurality of media services associated with the second user account, the second plurality of media services being different from the plurality of media services associated with the first user account.

Clause 8: A playback device comprising: one or more processors; and a computer-readable memory storing instructions that, when executed by the one or more processors, cause the playback device to perform operations comprising: receiving, at the playback device communicatively coupled to a video display device, user authentication credentials associated with a user account; causing the video display device to display a graphical user interface that includes a plurality of media services associated with the user account, each of the media services corresponding to a different media content provider; receiving a user selection for media playback of audio-visual content from a selected media service; transmitting, from the playback device, a request for the user-selected audio-visual content to the selected media service; receiving, at the playback device, audio content and video content of the audio-visual content; and playing back the audio content of the audio-visual content while the video display device synchronously plays back video content of the audio-visual content.

Clause 9: The playback device of any one of the Clauses herein, the operations further comprising: transmitting both the audio content and the video content of the audio-visual content to the video display device; and receiving, from the video display device, the audio content of the audio-visual content, wherein playing back the audio content of the audio-visual content while the video display device synchronously plays back video content of the audio-visual content occurs after receiving the audio content from the video display device.

Clause 10: The playback device of any one of the Clauses herein, wherein receiving, at the playback device, the audio content and the video content of the audio-visual content comprises receiving the audio content and the video content from the selected media service.

Clause 11: The playback device of any one of the Clauses herein, wherein receiving the user selection for media playback of audio-visual content from the selected media service comprises receiving the user selection from one or more remote computing devices unassociated with the selected media service.

Clause 12: The playback device of any one of the Clauses herein, wherein the graphical user interface is not stored locally on the playback device or the video display device.

Clause 13: The playback device of any one of the Clauses herein, wherein the user account is a first user account, the operations further comprising: receiving, at the audio playback device communicatively coupled to a video display device, second user authentication credentials associated with a second user account; and causing the video display device to display a second graphical user interface that includes a second plurality of media services associated with the second user account, the second plurality of media services being different from the plurality of media services associated with the first user account.

Clause 14: The playback device of any one of the Clauses herein, wherein the graphical user interface is accessible via a plurality of user accounts.

Clause 15: Tangible, non-transitory computer-readable medium storing instructions that, when executed by the one or more processors of a playback device, cause the playback device to perform operations comprising: receiving, at the playback device communicatively coupled to a video display device, user authentication credentials associated with a user account; causing the video display device to display a graphical user interface that includes a plurality of media services associated with the user account; receiving a user selection for media playback of audio-visual content from a selected media service; transmitting, from the playback device, a request for the user-selected audio-visual content to the selected media service; receiving, at the playback device, audio content and video content of the audio-visual content; and playing back the audio content of the audio-visual content while the video display device synchronously plays back video content of the audio-visual content.

Clause 16: The non-transitory computer-readable medium of any one of the Clauses herein, the operations further comprising: transmitting both the audio content and the video content of the audio-visual content to the video display device; and receiving, from the video display device, the audio content of the audio-visual content, wherein playing back the audio content of the audio-visual content while the video display device synchronously plays back video content of the audio-visual content occurs after receiving the audio content from the video display device.

Clause 17: The non-transitory computer-readable medium of any one of the Clauses herein, wherein receiving, at the playback device, the audio content and the video content of the audio-visual content comprises receiving the audio content and the video content from the selected media service.

Clause 18: The non-transitory computer-readable medium of any one of the Clauses herein, wherein receiving the user selection for media playback of audio-visual content from the selected media service comprises receiving the user selection from one or more remote computing devices unassociated with the selected media service.

Clause 19: The non-transitory computer-readable medium of any one of the Clauses herein, wherein the graphical user interface (i) is not stored locally on the playback device or the video display device, and (ii) is accessible via a plurality of user accounts.

Clause 20: The non-transitory computer-readable medium of any one of the Clauses herein, wherein the user account is a first user account, the operations further comprising: receiving, at the audio playback device communicatively coupled to a video display device, second user authentication credentials associated with a second user account; and causing the video display device to display a second graphical user interface that includes a second plurality of media services associated with the second user account, the second plurality of media services being different from the plurality of media services associated with the first user account.

Clause 21: A method of providing audio-visual content, the method comprising: receiving, at a server communicatively coupled to an audio playback device, user authentication credentials associated with a user account; providing, from the server, a graphical user interface (GUI) to be displayed at a video display device, the GUI including a plurality of media services associated with the user account; receiving a request corresponding to a user selection for media playback of audio-visual content provided via the GUI, the audio-visual content being associated with a selected media service; and transmitting the audio-visual content in response to the request, thereby enabling audio content of the audio-visual content to be played back via one or more transducers of the audio playback device and video content of the audio-visual content to be synchronously played back via the video display device.

Clause 22: The method of any one of the Clauses herein, wherein the server is a first server, and wherein receiving the request corresponding to the user selection occurs at a second server different than the first server.

Clause 23: The method of any one of the Clauses herein, wherein the server is a first server, and wherein transmitting the audio-visual content in response to the request occurs at a second server different than the first server.

Clause 24: The method of any one of the Clauses herein, wherein the server is a first server, and wherein transmitting the audio-visual content comprises transmitting, via a second server different than the first server, the audio-visual content directly to the audio playback device.

Clause 25: The method of any one of the Clauses herein, wherein the first server is unaffiliated with the second server.

Clause 26: The method of any one of the Clauses herein, wherein the first server is associated with the audio playback device.

Clause 27: The method of any one of the Clauses herein, wherein the second server is associated with the one of the plurality of media services.

The invention claimed is:

1. A first playback device lacking a video display, the first playback device comprising:

a housing surrounding one or more audio transducers;

a network interface;

one or more processors; and a computer-readable memory storing instructions that, when executed by the one or more processors, cause the first playback device to perform operations comprising:

causing a video display device to display a graphical user interface that includes one or more graphical representations corresponding to media content accessible to a first user account associated with the first playback device, the video display device separate from the housing of the first playback device, receiving an indication of user-selected media content associated with a particular media content provider, transmitting, via the network interface, a request for the user-selected media content, receiving, after transmitting the request, first media content corresponding to the user-selected media content, wherein receiving the first media content comprises receiving, via the network interface, the first media content from one or more servers associated with the particular media content provider, causing, via the video display device, playback of video content associated with the first media content, and causing, via a second playback device, playback of at least a first portion of audio content associated with the first media content, wherein causing playback of at least the first portion of the audio content comprises sending, via the network interface, the first portion of the audio content to the second playback device, the second playback device comprising a wearable playback device that includes a headphone, wherein the second playback device comprises the video display device, and wherein causing the video display device to display the graphical user interface comprises sending, via the network interface, the graphical user interface to the second playback device, and wherein causing playback of the video content associated with the first media content comprises sending, via the network interface, video content associated with the first media content to the second playback device.

2. The first playback device of claim 1, further comprising:

a hardware interface, wherein causing playback of the video content associated with the first media content comprises sending, via the hardware interface, the video content associated with the first media content to the video display device.

3. The first playback device of claim 1, wherein the operations further comprise:

causing, via a third playback device, playback of at least a second portion of the audio content associated with the first media content and playback of the first portion of audio content via the second playback device.

4. The first playback device of claim 3, wherein causing the playback of the first and second portions of the audio content via the second and third playback devices, respectively, comprises sending, via the network interface, (i) the first portion of audio content to the second playback device and (ii) the second portion of audio content to the third playback device.

5. The first playback device of claim 1, wherein the operations further comprise:

transmitting both the first portion of audio content associated with the first media content and the video content associated with the first media content to the video display device;

receiving, from the video display device, the first portion of audio content associated with the first media content; and after receiving the first portion of audio content associated with the first media content from the video display device, playing back the first portion of audio content associated with the first media content while the video display device synchronously plays back the video content associated with the first media content.

6. The first playback device of claim 1, wherein the operations further comprise:

receiving user authentication credentials associated with a second user account; and causing the video display device to display a graphical user interface that includes one or more graphical representations corresponding to media content accessible to the second user account, wherein the media content accessible to the second user account is different from the media content accessible to the first user account.

7. The first playback device of claim 1, wherein the first user account is one of a plurality of user accounts, and wherein the graphical user interface is accessible via each of the plurality of user accounts.

8. The first playback device of claim 1, wherein the user-selected media content is first user-selected media content associated with the first user account, wherein the operations further comprise:

causing, via a third playback device, display of the graphical user interface;

receiving an indication of second user-selected media content associated with a second user; and causing, via the third playback device, playback of audio and video content corresponding to the second user-selected media content.

9. A method, performed by a first playback device comprising one or more processors and lacking a video display, the method comprising:

causing a video display device to display a graphical user interface that includes one or more graphical representations corresponding to media content accessible to a first user account associated with the first playback device, the video display device separate from a housing surrounding one or more audio transducers;

receiving an indication of user-selected media content associated with a particular media content provider;

transmitting, via a network interface, a request for the user-selected media content;

receiving, after transmitting the request, first media content corresponding to the user-selected media content, wherein receiving the first media content comprises receiving, via the network interface, the first media content from one or more servers associated with the particular media content provider;

causing, via the video display device, playback of video content associated with the first media content; and causing, via a second playback device, playback of at least a first portion of audio content associated with the first media content, wherein causing playback of at least the first portion of the audio content comprises sending, via the network interface, the first portion of the audio content to the second playback device, the second playback device comprising a wearable playback device that includes a headphone, wherein the second playback device comprises the video display device, and wherein causing the video display device to display the graphical user interface comprises sending, via the network interface, the graphical user interface to the second playback device, and wherein causing playback of the video content associated with the first media content comprises sending, via the network interface, video content associated with the first media content to the second playback device.

10. The method of claim 9, wherein the first playback device comprises a hardware interface and wherein causing playback of the video content associated with the first media content comprises sending, via the hardware interface, the video content associated with the first media content to the video display device.

11. The method of claim 9, further comprising:

causing, via a third playback device, playback of at least a second portion of the audio content associated with the first media content and playback of the first portion of audio content via the second playback device.

12. The method of claim 11, wherein causing the playback of the first and second portions of the audio content via the second and third playback devices, respectively, comprises sending, via the network interface, (i) the first portion of audio content to the second playback device and (ii) the second portion of audio content to the third playback device.

13. The method of claim 9, further comprising:

transmitting both the first portion of audio content associated with the first media content and the video content associated with the first media content to the video display device;

receiving, from the video display device, the first portion of audio content associated with the first media content; and after receiving the first portion of audio content associated with the first media content from the video display device, playing back the first portion of audio content associated with the first media content while the video display device synchronously plays back the video content associated with the first media content.

14. The method of claim 9, wherein the user-selected media content is first user-selected media content associated with the first user account, the method further comprising:

causing, via a third playback device, display of the graphical user interface;

receiving an indication of second user-selected media content associated with a second user; and causing, via the third playback device, playback of audio and video content corresponding to the second user-selected media content.

15. One or more tangible, non-transitory computer-readable media storing instructions that, when executed by one or more processors of a first playback device lacking a video display, cause the first playback device to perform operations comprising:

causing a video display device to display a graphical user interface that includes one or more graphical representations corresponding to media content accessible to a first user account associated with the first playback device, the video display device separate from a housing surrounding one or more audio transducers;

receiving an indication of user-selected media content associated with a particular media content provider;

transmitting, via a network interface, a request for the user-selected media content;

receiving, after transmitting the request, first media content corresponding to the user-selected media content, wherein receiving the first media content comprises receiving, via the network interface, the first media content from one or more servers associated with the particular media content provider;

causing, via the video display device, playback of video content associated with the first media content; and causing, via a second playback device, playback of at least a first portion of audio content associated with the first media content, wherein causing playback of at least the first portion of the audio content comprises sending, via the network interface, the first portion of the audio content to the second playback device, the second playback device comprising a wearable playback device that includes a headphone, wherein the second playback device comprises the video display device, and wherein causing the video display device to display the graphical user interface comprises sending, via the network interface, the graphical user interface to the second playback device, and wherein causing playback of the video content associated with the first media content comprises sending, via the network interface, video content associated with the first media content to the second playback device.

16. The one or more tangible, non-transitory computer-readable media of claim 15, wherein the first playback device comprises a hardware interface and wherein causing playback of the video content associated with the first media content comprises sending, via the hardware interface, the video content associated with the first media content to the video display device.

17. The one or more tangible, non-transitory computer-readable media of claim 16, the operations further comprising:

causing, via a third playback device, playback of at least a second portion of the audio content associated with the first media content and playback of the first portion of audio content via the second playback device.

18. The one or more tangible, non-transitory computer-readable media of claim 17, wherein causing the playback of the first and second portions of the audio content via the second and third playback devices, respectively, comprises sending, via the network interface, (i) the first portion of audio content to the second playback device and (ii) the second portion of audio content to the third playback device.

19. The one or more tangible, non-transitory computer-readable media of claim 15, the operations further comprising:

transmitting both the first portion of audio content associated with the first media content and the video content associated with the first media content to the video display device;

receiving, from the video display device, the first portion of audio content associated with the first media content; and after receiving the first portion of audio content associated with the first media content from the video display device, playing back the first portion of audio content associated with the first media content while the video display device synchronously plays back the video content associated with the first media content.

20. The one or more tangible, non-transitory computer-readable media of claim 15, the operations further comprising:

causing, via a third playback device, display of the graphical user interface;

receiving an indication of second user-selected media content associated with a second user; and causing, via the third playback device, playback of audio and video content corresponding to the second user-selected media content.

* * * * *